United States Patent

[11] 3,542,204

[72] Inventor George B. Clark
    Waukesha, Wisconsin
[21] Appl. No. 797,317
[22] Filed Jan. 3, 1969
    Continuation-in-part of Ser. No. 678,039,
    Oct. 25, 1967, abandoned.
[45] Patented Nov. 24, 1970
[73] Assignee Aqua-Chem Inc.
    a corporation of Wisconsin

[54] TUBULAR REVERSE OSMOSIS EQUIPMENT
    15 Claims, 5 Drawing Figs.
[52] U.S. Cl. .................................................... 210/321,
    210/323, 210/433, 210/450, 210/455, 210/490
[51] Int. Cl. ....................................................... B01d 31/00
[50] Field of Search ............................................ 210/22, 23,
    500, 321, 489, 490, 491, 497, 433, 323, 336, 450,
    455

[56] References Cited
    UNITED STATES PATENTS
    2,197,805  4/1940  Lovett ............................ 210/500X
    2,353,489  7/1944  Newcomb ...................... 210/321
    2,757,800  8/1956  Kucera .......................... 210/450X
    3,430,770  3/1969  Clark et al. .................... 210/321
    FOREIGN PATENTS
    548,246  11/1947  Canada ......................... 210/321

Primary Examiner—Reuben Friedman
Assistant Examiner—Frank A. Spear, Jr.
Attorneys—Hofgren, Wegner, Allen, Stellman & McCord and Howard J. Barnett ABSTRACT: An apparatus for removing dissolved solids from a liquid by reverse osmosis including: a membrane structure of a generally uniform cross section which includes a tubular film formed of semi-permeable membrane material, a rigid tube surrounding the membrane structure to support and preclude the tubular film from rupturing when subjected internally to high pressures, an end cap adjacent to the rigid tube which contains at least one channel communicating with the interior of the tubular film to direct a liquid containing dissolved solids to be removed to the same, a gasket having a greater radial extent than the membrane structure to provide a seal between the membrane structure at one end and the end cap about the periphery of the channel to preclude the liquid in the channel from flowing to the interface of the rigid tube and the membrane structure except by diffusion through the tubular film.

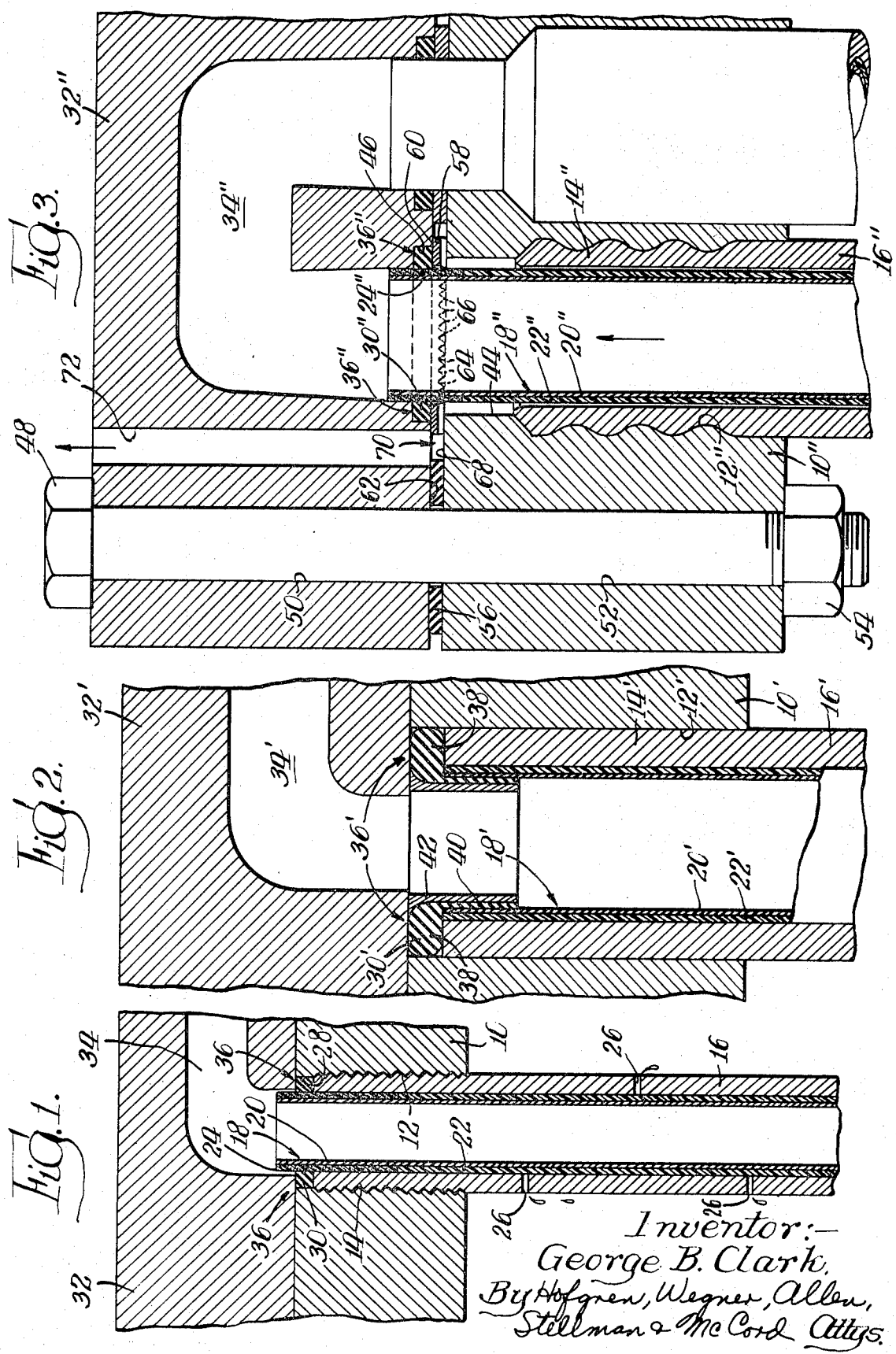

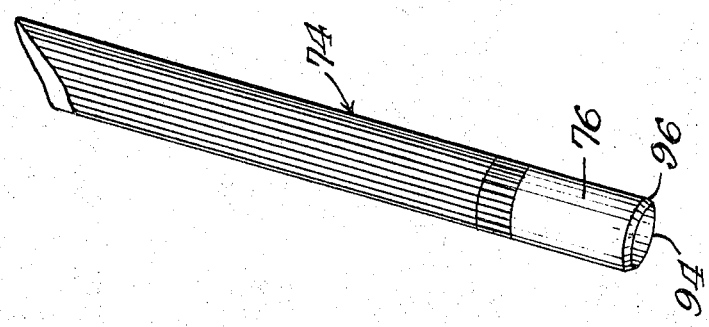
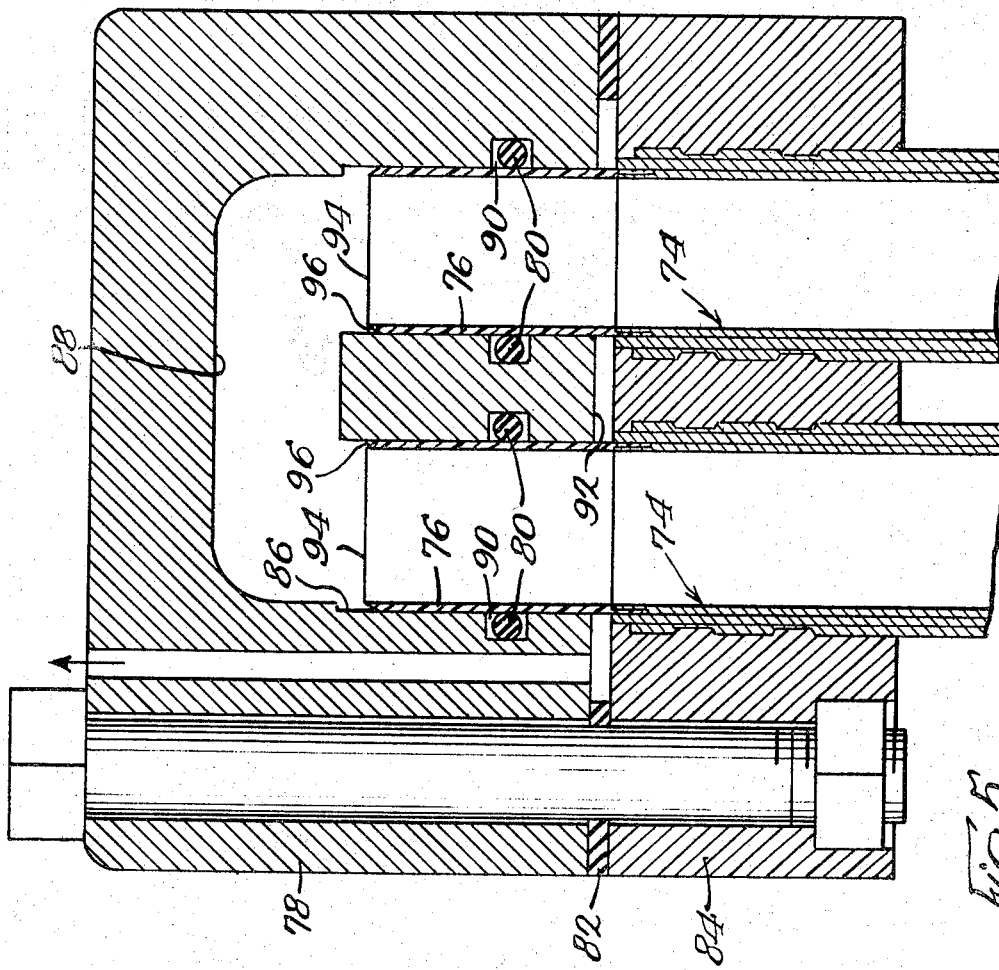

3,542,204

TUBULAR REVERSE OSMOSIS EQUIPMENT

CROSS REFERENCE

This application is a continuation-in-part of my copending U.S. Pat. application Ser. No. 678,039, filed Oct. 25, 1967, now abandoned.

BACKGROUND OF THE INVENTION

Because of the ever-increasing water shortage problem, considerable effort has been expended to develop economical methods and apparatus for removing the salt from sea water or for purifying brackish water. Thus far, most success has been achieved by distillation methods or apparatus or by electrodialysis methods and apparatus. However, considerable promise also exists in the process of reverse osmosis for economically providing potable water.

In order to purify salt water by reverse osmosis, sea water in contact with a semipermeable membrane must be subjected to pressure in excess of the osmotic pressure of the sea water. For a typical concentration of salt in sea water, the osmotic pressure is on the order of 350 p.s.i.g. and accordingly, a pressure differential in excess of that figure must be maintained across the membrane. In this respect, it is not unusual to provide a pressure differential on the order of about 1,000 p.s.i.g. and accordingly, it will be apparent that the membrane requires substantial support in order to resist rupture under such substantial pressures.

As a result, the prior art has resorted to the use of membranes that are filmlike in nature and tubular in configuration which are received within a rigid tube which supports the membrane when the liquid to be purified is directed against the inner surface of the tubular membrane at high pressure. Potable water diffusing through the membrane to the interface of the membrane and the supporting tube is then directed through small apertures in the supporting tube to be collected for use. Because the supporting tubes and the membranes must be of finite length, it is necessary that a seal be provided at the ends of the membranes to preclude the water to be purified and directed to the interior of the tubular membrane from flowing to the interface between the membrane and the supporting tube where potable water is present.

According to currently known techniques, the required end seal is provided by softening the end of the tubular membrane by chemical means and flaring the thus-softened end with an inflatable rubber tool to form a sealing surface. Because the tubular membranes are extremely thin, the process of flaring the ends thereof is one which is extremely tedious and time consuming and which is unsatisfactory to the extent that the number of membranes split during the flaring process is relatively high and the reliability of the seal thus formed is relatively low. Furthermore, because the flaring process is a relatively exacting one, it is an extremely difficult operation to perform on the site of a desalinization apparatus utilizing the reverse osmosis principle and as a result, when membranes require replacement, oftentimes the entire apparatus must be disassembled and the supporting tubes shipped to a factory for replacement and flaring of membranes.

SUMMARY OF THE INVENTION

It is the principal object of the invention to provide a new and improved end seal in desalinization equipment utilizing the reverse osmosis principle.

More specifically, it is an object to provide a new and improved end seal which is easily effected, may be performed on site, which is unlikely to damage the membranes and which provides a much more effective seal than heretofore known.

Another object is the provision of an apparatus such as that set forth above including a membrane structure of generally uniform cross section including a tubular film formed of a semipermeable membrane material, a rigid tube receiving the membrane structure to surround and support the same during operation of the apparatus, an end cap adjacent an end of the rigid tube and having at least one channel formed therein in fluid communication with the interior of the tubular film to direct a liquid containing dissolved solids to be removed thereto, and sealing means including a gasket having at least a portion of greater radial extent than the membrane structure sealingly engaging the end cap about the periphery of the channel, the gasket further sealingly engaging the membrane structure at end thereof to preclude liquid in the channel from flowing to the interface between the rigid tube and the membrane structure except by diffusion through the tubular film.

Yet another object is the provision of an apparatus such as that set forth in the preceding paragraph wherein the membrane structure includes the semirigid, porous tube, encircling the tubular film and in contact with the interior of the rigid tube, the ends of the semirigid, porous tube including a plastic coating sealingly engaging the gasket.

A further object is the provision of an apparatus such as that set forth in the preceding paragraph wherein the plastic coating comprises plastic ferrules bonded to the external surface of the ends of the porous tube.

Yet another object is the provision of an apparatus such as that set forth above wherein the gasket includes an inwardly directed minor portion having a radial extent substantially equal to the radial extent of the interior surface of the tubular film, the minor portion being received within the tubular film and sealingly engaging the interior surface thereof at an end of the tubular film together with a ferrule within the gasket holding the minor portion in sealing engagement with the tubular film.

Another object is the provision of an apparatus for removing the dissolved solids from a liquid by reverse osmosis including a tubular film of semipermeable membrane material, a rigid tube at least partially surrounding and supporting the tubular film, conduit means for directing a liquid to have dissolved solids removed therefrom to the interior of the tubular film through an end thereof, means separate from the rigid tube and bonded to the tubular film at at least an end thereof for rigidifying the end, the rigidifying means being liquid impervious, and sealing means including a gasket having a cross-sectional shape corresponding to the cross section of the tubular film adjacent the rigidifying means and associated with one of the rigid tube and the conduit means for precluding liquid from flowing from said conduit means to the interior surface of said rigid tubing except by diffusion through the tubular film.

Further objects and advantages will become apparent from the following specification taken in conjunction with the accompanying drawings.

DESCRIPTION OF THE DRAWINGS

FIG. 1 is a fragmentary sectional view of a portion of a reverse osmosis desalinization apparatus embodying an end seal made according to the invention;

FIG. 2 is a fragmentary sectional view of a desalinization apparatus embodying a modified form of end seal;

FIG. 3 is a fragmentary sectional view of such an apparatus embodying still another form of end seal;

FIG. 4 is a fragmentary plan view of a modified form of membrane structure; and

FIG. 5 is a fragmentary sectional view of a desalinization apparatus embodying still another form of end seal adapted for use with the modified membrane structure illustrated in FIG. 4.

DESCRIPTION OF THE PREFERRED EMBODIMENTS

One embodiment of a liquid-purifying apparatus operating on the principle of reverse osmosis and embodying the invention is illustrated in FIG. 1 and is seen to comprise a header 10 which may include a plurality of bores 12 (only one of which is shown) for receipt of the end 14 of a rigid support tube 16. The rigid support tube 16 is formed to withstand the relatively high-pressure differentials customarily present in purifying equipment operating under the principle of reverse osmosis and the ends thereof may be grooved with the header 10 cast thereabout to provide a mechanical bond.

Within the support tube 16 is an expendable, membrane structure, generally designated 18, which preferably is of the type disclosed in my copending U.S. Pat. application entitled "Expendable Membrane Tube and Apparatus Utilizing the Same", Ser. No. 678,051, filed concurrently herewith and assigned to the same assignee as the instant application, now abandoned. Details of the construction of the membrane structure 18 may be had by reference to said application. For the purposes of the instant application it is sufficient to state that the membrane structure 18 is generally cylindrical in shape and includes a tubular film 20 that is generally cylindrical in shape and is formed of a semipermeable membrane material as is known in the art.

Surrounding the tubular film 20 is a semirigid, porous tube 22 which has its ends (only one of which is shown) coated with a liquid-impervious material 24 which serves to rigidify the same for sealing purposes as will be seen.

In operation, a liquid containing dissolved solids to be removed such as sea water is conveyed to the interior of the tubular film 20 and subjected to a pressure in excess of its osmotic pressure and as a result, the liquid will diffuse through the tubular film 20 in a purified form and flow through the porous, semirigid tube 22 to the interface between the membrane structure 18 and the rigid tube 16. In the embodiment illustrated in FIG. 1, the rigid tube 16 is provided with a plurality of apertures 26 extending through the walls thereof so that a purified liquid at the above-mentioned interface may exit from the rigid tube 16 via the apertures 26 for subsequent collection.

Of course, for the above-mentioned process to take place, liquid to be purified must be conveyed to the interior of the tubular film 20 and the same must be precluded from mixing with the purified liquid at the interface between the rigid tube 16 and the membrane structure 18. Accordingly, adjacent the outermost end of the bore 12 and the header 10 is an annular groove 28 which receives a gasket 30 which may be in the nature of a conventional O-ring having a radial extent greater than that of the membrane structure. Additionally, in order to direct the liquid to be purified to the interior of the tubular film 20, an end cap 32 having a channel 34 is tightly clamped by any suitable means to the header 10 in such a way that the channel 34 will be in fluid communication with the interior of the tubular film 20.

The channel 34 is constructed such that its boundary, generally designated 36, at the channel's point of emergence from the end cap 32 will sealingly engage the gasket 30 and somewhat compress the same against the outer edge of the annular groove 28, the end of the rigid tube 16 and the water-impervious coating 24 on the membrane structure 18. As a result, fluid communication between the channel 34 and the interface between the membrane structure 18 and the rigid tube 16 is precluded except for purified liquid which diffuses through the tubular film 20.

Turning now to FIG. 2, a second embodiment of a liquid purifying apparatus utilizing the principle of reverse osmosis and embodying the invention is illustrated. For the sake of convenience, elements in the FIG. 2 embodiment corresponding to the same elements in FIG. 1 will be designated by the same reference numerals appearing in the latter except that they are primed.

A header 10' is provided which includes a bore 12' which receives an end 14' of a rigid support tube 16'. The support tube 16' includes apertures (not shown) corresponding to the apertures 26 in the embodiment illustrated in FIG. 1.

Within the rigid support tube 16' is a membrane structure, generally designated 18' which, in all respects is identical to the membrane structure 18 except that the coating 24 is omitted. That is, the membrance structure 18' consists entirely of a tubular film 20' and a semirigid porous tube 22' interrelated in the same manner as the tubular film 20 and semirigid porous tube 22.

Again, an end cap 32' including a channel 34' having a boundary 36' is provided and a gasket 30' sealingly engages the end 14' of the rigid tube 16', the membrane structure 18' and the boundary 36' at the point of emergence of the channel 34' from the end cap 32'.

The gasket 30' differs somewhat from the gasket 30 in that the former includes a major portion 38 and a minor portion 40. The major portion 38 is generally circular in shape and has a greater radial extent than the membrane structure 18'. The minor portion 40 is generally cylindrical in shape and has a radial extent approximately equal to the radial extent of the inner surface of the tubular film 20' and extends inwardly into the membrane structure 18' to sealingly engage the end of the tubular film 20'.

The major portion 38 of the gasket 30' is located in a gap formed by the end 14' of the rigid tube 16', the wall of the bore 12' and the boundary 36' of the channel 34' in the end cap 32' and the arrangement is such that a sealing engagement is obtained between the major portion 38 of the gasket 30', the end 14' of the rigid tube 16' and the boundary 36' of the channel 34'. As pointed out above, a sealing engagement is also formed between the minor portion 40 of the gasket 30' and the membrane structure 18' at the end of the tubular film 20'.

In order to insure a positive seal at the last-named location, a generally cylindrical ferrule 42 is located within the gasket 30' to embrace the radially inner surface thereof along its entire length and thereby hold the minor portion 40 in tight engagement with the inner surface of the end of the tubular film 20'.

Turning now to FIG. 3 another embodiment of a liquid purifying apparatus utilizing the principle of reverse osmosis is illustrated. The apparatus of FIG. 3 utilizes a membrane structure, generally designated 18", in all respects identical to the membrane structure utilized in the embodiment illustrated in FIG. 1, and accordingly, it is not believed necessary to further describe the membrane structure 18".

The apparatus illustrated in FIG. 3, like the apparatus illustrated in FIGS. 1 and 2 includes a header 10" including a bore 12" which receives an end 14" of a rigid support tube 16". The support tube 16", unlike the support tubes utilized in the apparatus illustrated in FIGS. 1 and 2, does not require the use of apertures for permitting liquid accumulating at the interface between the support 16" and the membrane structure 18" to be collected.

Rather, advantage is taken of the porous characteristic of the semirigid tube 22" which allows water diffusing through the tubular film 20" to flow laterally to a collection space defined by a narrow neck 44 of the bore 12" at the outer end of the latter as will be seen.

The apparatus illustrated in FIG. 3 also includes an end cap 32" including a channel 34" which has a boundary 36" at the point of emergence of the channel 34" from the end cap 32" and which is defined by an annular groove 46 in the end cap 32". Within the annular groove 46 there is received a gasket 30" having a greater radial extent than the membrane structure 18" and which provides a seal between the boundary 36" and the coating 24" on the membrane structure 18" while permitting liquid to be purified within the channel 34" to flow to the interior of the tubular film 20".

The end cap 32" is secured to the header 10" by means of a bolt 48 which passes through alined bores 50 and 52 in the end cap 32" and header 10", respectively, to impale a nut 54. Around the edges of the interface of the end cap 32" and the header 30" there is provided a sealing gasket 56 which, together with a spacing washer 58 define a collection channel whereby purified liquid from the collection space 44 may flow to a point of collection. More specifically, the spacing washer 58 includes an outer surface 60 which sealingly engages the gasket 30" and tends to hold the same within the annular groove 46. The smooth outer surface 60 also engages the inner surface 62 of the end cap 32" to support the same in spaced relation with respect to the header 10".

The inner surface of the spacing washer 58 is defined by a plurality of grooves 64 separated by lands 66, the latter being engaged with the outer surface 68 of the header 10''. As a result, liquid within the collection space 44 may flow through the grooves 64 to a space, generally designated 70, between the end cap 32'' and the header 10''. The space 70 in turn is in fluid communication with a bore 72 in the end cap 32'' so that liquid may flow through the bore 72 to a point of collection for subsequent use.

Referring now to FIG. 4, a modified form of membrane structure is illustrated and is generally designated 74. The membrane structure 74 may be formed identically to the membrane structures 18 and 18'' except that the plastic coatings 24 and 24'' are not used. Rather, a plastic ferrule 76 is applied to the ends of the membrane structure 74 and is bonded to the external surface thereof by any suitable means. For example, polycarbonate and suitable solvent may be used for a bonding material.

The modified tubular membrane structure 74 incorporating an end ferrule 76 is well adapted for use in an improved sealing system shown in FIG. 5. The embodiment shown therein is similar to that illustrated in FIG. 3 but with several improvements, the most important being the modified end construction of cap 78 which isolates O-ring seals 80 from the gasket seals 82 between a header 84 and the end cap 78. A comparison of FIGS. 3 and 5 will illustrate that the individual tubular membrane structures extend further into openings 86 of channels 88 than does a membrane structure 18''.

Annular O-ring recesses 90 are provided around the periphery of the respective openings 86 which are spaced outwardly from the inner surfaces 72 of the end cap 78. As can be seen, the O-ring seals 80 are urged tightly against the plastic outer surfaces of the respective ferrules 76 to provide an effective, isolated seal to insure separation of raw liquid and product liquid.

To facilitate the insertion of a membrane structure 84 into an opening 86, the exterior outermost ends 94 of the ferrule 76 may be provided with a conical taper 96. When such a membrane structure 74 is inserted into an opening 86, a conical surface 96 on the plastic ferrule 76 tends to cam the O-ring seal 80 into the annular recesses 90 so that the membrane structure 74 is easily received within the opening 86. If the O-rings 80 are dimensioned so as to extend radially inwardly into the openings 86 when no membrane structure 76 is present, when a membrane structure 76 is inserted, the O-ring 80 will be somewhat distorted. The inherent resiliency of the O-ring 80 will result in pressure being exerted by the O-ring 80 against the plastic ferrule 76 and the groove 90 in the end cap 78 to provide an excellent seal.

The embodiment illustrated in FIG. 5 provides several advantages in terms of ease of replacement of membrane structures. Specifically, when a membrane structure is to be replaced, it is only necessary to remove the end cap 78 from one side of the apparatus, remove the membrane structure 74 requiring replacement, insert a new membrane structure 74 and replace the end cap 78. The construction of the plastic ferrule 76 and the location of the O-ring 80 insures that such a replacement process requires no manipulation of end seals or membrane structure other than the mere insertion of the membrane structure within its respective support tube.

Furthermore, the spacing of the O-ring 80 from the interface between the end cap 78 and the header 84 permits the omission of spacing washers such as shown at 58 in FIG. 3, the gasket 82 being sufficient to space the end cap 78 from the header 84 a distance sufficient to permit the collection of product liquid in the manner set forth previously in conjunction with the description of FIG. 3.

From the foregoing, it will be appreciated that an apparatus for purifying liquid utilizing the principle of reverse osmosis made according to the invention provides a significant advantage over those heretofore known in that membrane structures do not require flaring in order to insure an adequate seal between the membrane material and the support tubes therefor. As a result, an apparatus constructed according to the invention may be easily disassembled on site for replacement of the membrane structure, a factor which minimizes downtime, inventory costs and transportation expenditures.

Furthermore, when an apparatus according to the invention, and more specifically, according to the teaching utilized in the embodiments of FIGS. 1 and 3, is constructed, it will be appreciated that tolerances with respect to length of the membrane structures may be relatively loose in that excess length of the same is easily accommodated within the channels. Accordingly, the necessity of precise fitting of the membrane structures in their respective support tubes is done away with.

Finally, apparatus embodying the invention, because of the positive nature of the seals, has a much higher reliability than heretofore obtainable with flared seals. Accordingly, process efficiency and thus the cost of purifying the liquid is significantly more economically advantageous and downtime required to locate faulty seals is minimized.

Having described a specific embodiment of my invention as required by 35 U.S.C. 112, I do not wish to be limited to the precise details set forth, but rather, to have my invention construed according to the following claims.

I claim:

1. In an apparatus for removing dissolved solids from a liquid by reverse osmosis, the combination comprising: a tubular film of semipermeable membrane material; means for maintaining said film in a tubular configuration; a rigid tube at least partially surrounding and supporting said tubular film to preclude the same from rupturing when subjected internally to relatively high pressures; conduit means for directing a liquid to have dissolved solids removed therefrom to the interior of said tubular film through an end thereof; means separate from said rigid tube and bonded to said tubular film at least at said end for rigidifying said end, said rigidifying means being liquid impervious; and sealing means including a gasket having a cross-sectional shape corresponding to the cross section of said tubular film adjacent said rigidifying means and sealingly engaging said rigidifying means and at least one of said rigid tube and said conduit means for precluding said liquid from flowing from said conduit means to the interior surface of said rigid tube except by diffusion through said tubular film.

2. An apparatus according to claim 1 further including header means for supporting said rigid tube, said header means including a bore receiving said tube, the end of said bore together with the end of said rigid tube defining a gasket receiving space for receipt of said gasket; said conduit means comprising an end cap including a channel alined with the interior of said tubular film, said gasket in said gasket receiving space sealingly engaging said end cap about the boundary of said channel at its point of emergence from the end cap; said tubular film and said rigidifying means thereon extending from said rigid tube a sufficient distance to engage said gasket in said gasket receiving space.

3. An apparatus according to claim 1 further including header means supporting said rigid tube; said conduit means being comprised of an end cap having a channel therein alined with the interior of said tubular film, said end cap being in close proximity to said header means; an annular groove in said end cap surrounding said channel, said gasket being received in said groove with said tubular film and said rigidifying means therefore extending into said end cap at least to the depth of said annular groove.

4. An apparatus according to claim 3 further including a washer surrounding said tubular film and interposed between said end cap and said header means, said washer including a surface abutting both said end cap and said gasket.

5. An apparatus according to claim 3 wherein said rigidifying means comprises a liquid-impervious ferrule and said annular groove is remote form the interface of said header means and said end cap; sealing means interposed between said header means and said end cap to space the same and provide a liquid collection space; said ferrule including a tapered end.

6. Reverse osmosis liquid purification equipment, comprising: a tubular film of semipermeable membrane material;

means for holding said tubular film in a tubular configuration; a rigid tube at least partially surrounding and supporting said tubular film to preclude the same from rupturing when subjected internally to relatively high pressures; an end cap having a channel therein alined with the interior of said tubular film; header means supporting said rigid tube; means for securing said end cap to said header means; an annular groove in said end cap surrounding said channel; an O-ring seal within said annular groove; a ferrule having a tapered outer end secured to an end of said tubular film, at least a portion of said ferrule extending from said rigid tube and into said channel at least to the depth of said annular groove and sealingly engaging said O-ring seal, said apparatus being constructed and arranged so that said tubular film may be replaced by removing the end cap from said header means, removing the tubular film from said rigid tube, inserting a new tubular film into the rigid tube and replacing the end cap whereby the taper on the ferrule will cam the O-ring seal into sealing engagement with the annular groove and the ferrule will be sealingly engaged by the O-ring seal.

7. An apparatus according to claim 6 wherein said holding means comprises a semirigid tube surrounding said tubular film and being bonded thereto, said semirigid tube being receivable within said rigid tube and being adapted to support said tubular film during the transportation and the insertion of the same into said rigid tube.

8. In an apparatus for moving dissolved solids from a liquid by reverse osmosis, the combination comprising: a membrane structure of generally uniform cross section including a tubular film formed of a semipermeable membrane material; a rigid tube receiving said membrane structure to at least partially surround the same for supporting said tubular film to preclude the tubular film from rupturing when internally subjected to relatively high pressures; an end cap adjacent an end of said rigid tube, said end cap including at least one channel formed therein in fluid communication with the interior of said tubular film to direct a liquid containing dissolved solids to be removed thereto; and sealing means including a gasket having at least a portion of greater radial extent than said membrane structure sealingly engaging both said end cap about the periphery of said channel and an end of said rigid tube, said gasket further sealingly engaging said membrane structure at an end thereof to preclude liquid in said channel from flowing to the interface between said rigid tube and said membrane structure except by diffusion through said tubular film, said membrane structure further including a semirigid, porous tube encirclingly supporting said tubular film and in contact with the interior of said rigid tube, the ends of said semirigid, porous tube including a plastic coating sealingly engaging said gasket.

9. In an apparatus for moving dissolved solids from a liquid by reverse osmosis, the combination comprising: a membrane structure of generally uniform cross section including a tubular film formed of a semipermeable membrane material; a rigid tube receiving said membrane structure to at least partially surround the same for supporting said tubular film to preclude the tubular film from rupturing when internally subjected to relatively high pressures; an end cap adjacent an end of said rigid tube, said end cap including at least one channel formed therein in fluid communication with the interior of said tubular film to direct a liquid containing dissolved solids to be removed thereto; and sealing means including a gasket having at least a portion of greater radial extent than said membrane structure sealingly engaging said end cap about the periphery of said channel, said gasket further sealingly engaging said membrane structure at an end thereof to preclude liquid in said channel from flowing into the interface between said rigid tube and said membrane structures except by diffusion through said tubular film, said membrane structure further including a semirigid, porous tube encirclingly supporting said tubular film and in contact with the interior of said rigid tube, the ends of said semirigid, porous tube including liquid impervious means sealingly engaging said gasket.

10. An apparatus according to claim 9 wherein said liquid impervious means comprises a ferrule bonded to said semirigid, porous tube.

11. In an apparatus for moving dissolved solids from a liquid by reverse osmosis, the combination comprising: a membrane structure of generally uniform cross section including a tubular film formed of a semipermeable membrane material; a rigid tube receiving said membrane structure to at least partially surround the same for supporting said tubular film to preclude the tubular film from rupturing when internally subjected to relatively high pressures; an end cap adjacent an end of said rigid tube, said end cap including at least one channel formed therein in fluid communication with the interior of said tubular film to direct a liquid containing dissolved solids to be removed thereto; and sealing means including a gasket having at least a portion of greater radial extent than said membrane structure sealingly engaging said end cap about the periphery of said channel, said gasket further sealingly engaging said membrane structure at an end thereof to preclude liquid in said channel from flowing to the interface between said rigid tube and said membrane structure except by diffusion through said tubular film, said gasket being spaced from the end of said rigid tubing; means defining a product receiving space between said gasket and said end of said rigid tube; said membrane structure further including a generally cylindrical, semirigid, porous tube surrounding and supporting said tubular film and in contact with the interior surface of said rigid tube, the ends of said semirigid tube being provided with liquid impervious means sealingly engaging said gasket.

12. An apparatus according to claim 11 wherein said liquid impervious means comprises a ferrule bonded to said semirigid, porous tube.

13. An apparatus according to claim 12 wherein the end of said ferrule is tapered.

14. In an apparatus for moving dissolved solids from a liquid by reverse osmosis, the combination comprising: a membrane structure of generally uniform cross section including a tubular film formed of a semipermeable membrane material; a rigid tube receiving said membrane structure to at least partially surround the same for supporting said tubular film to preclude the tubular film from rupturing when internally subjected to relatively high pressures; an end cap adjacent an end of said rigid tube, said end cap including at least one channel formed therein in fluid communication with the interior of said tubular film to direct a liquid containing dissolved solids to be removed thereto; and sealing means including a gasket having at least a portion of greater radial extent than said membrane structure sealingly engaging said end cap about the periphery of said channel, said gasket further sealingly engaging said membrane structure at an end thereof to preclude liquid in said channel from flowing to the interface between said rigid tube and said membrane structure except by diffusion through said tubular film, said channel including an annular groove located inwardly of the end thereof; said gasket being disposed in said groove; said membrane structure further including a semirigid, porous tube surrounding and bonded to said tubular film, and a liquid-impervious ferrule bonded to the end of said semirigid, porous tube.

15. An apparatus according to claim 14 wherein the end of said ferrule is tapered.